Patented July 19, 1949

2,476,833

UNITED STATES PATENT OFFICE 2,476,833

STABILIZATION OF GR-S, ETC., WITH A MIXTURE OF A TRIALKYLPHENOL AND A STANNOUS SALT

Harry E. Albert, Akron, Ohio, assignor to The Firestone Tire & Rubber Company, Akron, Ohio, a corporation of Ohio No Drawing. Application December 9, 1947, Serial No. 790,711

12 Claims. (Cl. 260—45.75)

This invention relates to the stabilization of the rubber-like copolymer of 1,3-butadiene and styrene known as GR-S. More generally it relates to the stabilization of copolymers of a conjugated-diene monomer—for example, 1,3-butadiene, isoprene, 2-cyanobutadiene-1,3, cyclopentadiene-1,3, piperylene, dimethylbutadiene-1,3, 2-methylpentadiene-1,3, etc.—and a vinyl aromatic monomer—for example, styrene, alpha-methyl styrene, nuclear-substituted styrenes, monochlorostyrene, dichlorostyrene, vinylnaphthalene, vinylbiphenyl, vinylcarbazole, 2-vinyl-5-ethylpyridine, 2-ethyl-5-vinylpyridine, etc. The invention includes the process of stabilization and the stabilized product.

It has previously been proposed to use trialkylated phenols as stabilizers for such rubber-like materials. They discolor the copolymer slightly if at all on aging, particularly in ultraviolet light, whether the aging occur before or after curing, and, therefore, are preferable to the stabilizers now used commercially. However, these alkylated phenols leave something to be desired in the way of protection. According to the present invention, such protection is afforded by using with a trialkylated phenol the tin salt of an acid from the group consisting of aliphatic and alicyclic carboxylic acids containing at least seven and up to twenty carbon atoms.

Although the tests which follow refer particularly to the use of 2,6-di-tert-butyl-p-cresol as the trialkylated phenol, and this material may be preferred, there may be used in the stabilizer other trialkylated phenols which contain a total of five to twenty carbon atoms in the three alkyl groups, as, for example:

2,4-dimethyl-6-tert-butylphenol
2,4-dimethyl-6-tert-octylphenol
2,4,6-tri-tert-butylphenol
2,4-dimethyl-6-tert-amylphenol
2,4-dimethyl-6-heptylphenol
2,4,6-tri-isopropylphenol
2,6-di-tert-butyl-4-ethylphenol
2,6-di-tert-butyl-4-isopropylphenol
2,6-di-tert-amyl-4-methylphenol
2,6-di-tert-amyl-4-ethylphenol
2,6-di-tert-octyl-4-isobutylphenol The stannous salt may be derived from any aliphatic or alicyclic acid which contains a total of seven to twenty carbon atoms. The following are illustrative of the acids from which the stannous salt may be derived:

Palmitic acid
Myristic acid
Oleic acid
Stearic acid
Lauric acid
Naphthenic acid
Abietic acid
Hydrogenated rosin acid
Dehydrogenated rosin acid
Cyclohexane carboxylic acid
Dicyclobutane monocarboxylic acids
Decahydronaphthalene monocarboxylic acids
2-ethylhexanoic acid The addition of the tin salts has little or no effect on the color of the rubber composition on aging. In general, about 2 per cent of the trialkylphenol based on the weight of the copolymer will be employed together with 1 per cent of the stannous salt although the ratio of the two components of the stabilizer may be varied and the amount of the stannous salt may be greater than the amount of the trialkylated phenol; in general the sum of the amounts of the two components will be 0.1 to 10 per cent, more or less, of the weight of the copolymer. The tests were carried out on copolymer formed by emulsion copolymerization, to which were added the test stabilizer and a commercial stabilizer identified herein as Stabilizer No. 1, which was used as a control. Emulsions containing the respective stabilizers were added to latex prepared by emulsion copolymerization to bring the amount of stabilizer to 2 per cent, by weight, of the copolymer. Each latex was then coagulated with aluminum sulfate of low-iron content. The tests recorded in the first table relate to treatment of the resulting coagula, and the succeeding tests refer to results obtained by vulcanization of these coagula after they had been dried. In each of the tests the 2,4,6-trialkylated phenol employed was 2,6-di-tert-butyl-p-cresol identified in the tables by the initials DBC. The stannous salt was the salt of a naphthenic acid with an acid number of about 210. This corresponds to an equivalent weight of 263. The first table records the color and the results of a hand test on each copolymer sample after drying and after oven aging at 110° C. This hand test consisted of pulling and feeling the polymer sample to detect any softening, stiffening, or other signs of deterioration.

TABLE I
Copolymer tests

| Stabilizer | After Drying 20 Hours at 75° C. | | Heat-aging at 110° C. | | | |
|---|---|---|---|---|---|---|
| | | | One Day | | Two Days | |
| | Color | Hand Test | Color | Hand Test | Color | Hand Test |
| 2% DBC | Light grayish-brown. | No deterioration. | Brownish-yellow. | Slightly set up. | Brownish-yellow | Somewhat set up and slightly hardened on surface. |
| 2% DBC+1% stannous naphthenate. | Light cream color. | ...do... | Cream color | No change | Light yellow | No change. |
| 2% Stabilizer No. 1 | Bluish-gray | ...do... | Brown | Very slightly set up. | Dark brown | Somewhat set up. |

The above data show that the addition of the stannous naphthenate together with the trialkylated phenol improves the resistance of the copolymer to aging to the extent that it is superior to the control, the most widely used commercial non-discoloring GR-S stabilizer at the present time. This is not true of the trialkylated phenol or the stannous naphthenate when used alone.

For the following tests vulcanizates were prepared by curing copolymer of butadiene and styrene to which two per cent of the different stabilizing ingredients were added in latex form. The copolymer was compounded according to the following formula:

| | Parts by weight |
|---|---|
| Copolymer containing 2% stabilizer | 100.00 |
| Coumarone resin | 10.00 |
| Triethyl trimethylene triamine | 1.10 |
| Wax | 2.00 |
| Magnesium oxide | 8.00 |
| Zinc oxide | 100.00 |
| Ultramarine blue | 0.10 |
| Titanium dioxide | 30.00 |
| Insoluble sulfur | 4.00 |

The compounded copolymer was cured for 30, 50, and 70 minutes at 290° F., and in the following table there are recorded tests on the physical properties which are the average of tests obtained on vulcanizates produced by the three different cures:

TABLE II
Vulcanizate properties

| Stabilizer | 200% Modulus | | | Tensile Strength | | | Elongation at Break | | |
|---|---|---|---|---|---|---|---|---|---|
| | Normal | Aged[1] | Per cent of Normal | Normal | Aged | Per cent of Normal | Normal | Aged | Per cent of Normal |
| 2% DBC | 310 | 700 | 226 | 1,375 | 1,420 | 103 | 530 | 405 | 77 |
| 2% DBC+1% stannous naphthenate | 325 | 640 | 197 | 1,390 | 1,390 | 100 | 515 | 400 | 78 |
| 2% Stabilizer No. 1 | 290 | 610 | 210 | 1,210 | 1,290 | 107 | 570 | 400 | 70 |

[1] Aged 4 days in oven at 212° F.
(The modulus and tensile strength are given herein in pounds per square inch.)

The vulcanizate was aged by heating four days in an oven at 212° F. Compared to the use of the trialkylated phenol alone, the combination with the stannous naphthenate shows a smaller increase in modulus on aging but is about equivalent on tensile and elongation retention. The combination gives results definitely superior to the control with respect to elongation retention and about equivalent with respect to modulus and tensile change.

The stock compounded according to the above formula is heavily loaded with white pigment and is, therefore, well suited for testing for discoloration. The following test results show that the stabilizer does not discolor appreciably, and it is, therefore, suitable for use in white sidewall tire stock and for the production of pastel-colored products, etc. The recorded results are an average of the results of tests conducted on stocks subjected to the three different cures mentioned. The first of the following tables records the results of artificial aging under two different conditions; namely, in a Fadeometer at 125° F. and under a General Electric sunlamp at 7 inches. The next table refers to natural exposure tests conducted on tapered dumbbell strips cured 50 minutes at 290° F. while stretched 12½ per cent. The natural aging was conducted for 2 months in Florida (February to April) and then 4 months in Ohio (May to September).

TABLE III
Artificial exposure tests

| Stabilizer | Fadeometer | | Sunlamp | |
|---|---|---|---|---|
| | 5 Hours | 10 Hours | 8 Hours | 16 Hours |
| 2% DBC | White | White | White | Light cream. |
| 2% DBC+1% stannous naphthenate. | ...do... | ...do... | ...do... | White. |
| 2% stabilizer No. 1 | Cream | Light brown. | Tan | Light brown. |

The above tests show that the combination of the naphthenate with the trialkylated phenol gives increased resistance to discoloration under the sunlamp. The control is greatly inferior to the trialkylated phenol alone or with the stannous salt.

TABLE IV
Natural exposure tests

| Stabilizer | Color | Checking |
|---|---|---|
| 2% DBC | Very light cream. | Severe. |
| 2% DBC+1% stannous naphthenate. | ...do... | Moderate to severe. |
| 2% stabilizer No. 1 | Tan | Extremely severe (to extent of cracking). |

The results in Table IV show the combination of stabilizing materials to be somewhat better than the trialkylated phenol alone in respect to checking on exposure. Both alone and with the stannous salt the stabilization is much better than that obtained with the commercial control, and there is little effect on the color.

The invention is not limited to the specific disclosure but includes such modifications thereof as are defined in the appended claims.

What I claim is:

1. Rubber-like copolymer of a conjugated-diene monomer and a vinyl aromatic monomer stabilized with a small but substantial amount of both (a) a trialkylphenol containing a total of five to twenty carbon atoms in the three alkyl groups and (b) a stannous salt of the class consisting of aliphatic and alicyclic carboxylic acids which contain seven to twenty carbon atoms.

2. Uncured rubber-like copolymer of butadiene-1,3 and styrene stabilized with a small amount of a mixture of a small but substantial amount of both (a) a trialkylphenol containing a total of five to twenty carbon atoms in the three alkyl groups and (b) the stannous salt of an aliphatic carboxylic acid which contains seven to twenty carbon atoms.

3. Uncured rubber-like copolymer of butadiene-1,3 and styrene stabilized with a small amount of a mixture of a small but substantial amount of both (a) a trialkylphenol containing a total of five to twenty carbon atoms in the three alkyl groups and (b) the stannous salt of an alicyclic carboxylic acid which contains seven to twenty carbon atoms.

4. Uncured rubber-like copolymer of butadiene-1,3 and styrene stabilized with a small amount of 2,6-di-tert-butyl-p-cresol and the stannous salt of a naphthenic acid.

5. Vulcanizate of rubber-like copolymer of styrene and butadiene-1,3 stabilized with a small but substantial amount of both (a) a trialkylphenol containing a total of five to twenty carbon atoms in the three alkyl groups and (b) a stannous salt of the class consisting of the stannous salts of the aliphatic and alicyclic carboxylic acids which contain seven to twenty carbon atoms.

6. Vulcanizate of rubber-like copolymer of styrene and butadiene-1,3 stabilized with a small but substantial amount of both (a) a trialkylphenol which contains a total of five to twenty carbon atoms in the three alkyl groups and (b) the stannous salt of an aliphatic carboxylic acid which contains seven to twenty carbon atoms.

7. Vulcanizates of rubber-like copolymer of styrene and butadiene-1,3 stabilized with a small but substantial amount of both (a) a trialkylphenol which contains a total of five to twenty carbon atoms in the three alkyl groups and (b) the stannous salt of an alicyclic carboxylic acid which contains seven to twenty carbon atoms.

8. The process of producing stabilized rubber-like copolymer of a conjugated-diene monomer and a vinyl aromatic monomer which comprises adding to the latex resulting from the copolymerization thereof a small but substantial amount of both (a) a trialkylphenol containing a total of five to twenty carbon atoms in the three alkyl groups and (b) the stannous salt of an aliphatic carboxylic acid which contains seven to twenty carbon atoms, and then coagulating and drying.

9. The process of producing stabilized rubber-like copolymer of a conjugated-diene monomer and a vinyl aromatic monomer which comprises adding to the latex resulting from the copolymerization thereof a small but substantial amount of both (a) a trialkylphenol containing a total of five to twenty carbon atoms in the three alkyl groups and (b) the stannous salt of an alicyclic carboxylic acid which contains seven to twenty carbon atoms and then coagulating and drying.

10. The process of producing stabilized rubber-like copolymer of a conjugated-diene monomer and a vinyl aromatic monomer which comprises sulfur-curing the same in the presence of a small but substantial amount of both (a) a trialkylphenol containing a total of five to twenty carbon atoms in the three alkyl groups and (b) the stannous salt of an aliphatic carboxylic acid which contains seven to twenty carbon atoms.

11. The process of producing stabilized rubber-like copolymer of a conjugated-diene monomer and a vinyl aromatic monomer which comprises sulfur-curing the same in the presence of a small but substantial amount of both (a) a trialkylphenol containing a total of five to twenty carbon atoms in the three alkyl groups and (b) the stannous salt of an alicyclic carboxylic acid which contains seven to twenty carbon atoms.

12. The process of producing stabilized rubber-like copolymer of butadiene-1,3 and a vinyl aromatic monomer which comprises sulfur-curing the same in the presence of a small but substantial amount of both stannous naphthenate and a trialkylphenol which contains a total of five to twenty carbon atoms in the three alkyl groups.

HARRY E. ALBERT.

No references cited.